United States Patent
Kijima et al.

(10) Patent No.: US 7,002,631 B2
(45) Date of Patent: Feb. 21, 2006

(54) IMAGE PICKUP APPARATUS INCLUDING COMPENSATION RESPONSIVE TO PHASED DRIVE OF CHARGE TRANSFER GATES

(75) Inventors: Takayuki Kijima, Akiruno (JP); Hideaki Yoshida, Hachioji (JP)

(73) Assignee: Olympus Corporation, Tokyo (JP)

(*) Notice: Subject to any disclaimer, the term of this patent is extended or adjusted under 35 U.S.C. 154(b) by 784 days.

(21) Appl. No.: 10/017,525

(22) Filed: Dec. 7, 2001

(65) Prior Publication Data

US 2002/0105590 A1  Aug. 8, 2002

(30) Foreign Application Priority Data

Dec. 12, 2000  (JP)  ............................. 2000-378010

(51) Int. Cl.
H04N 5/235 (2006.01)
H04N 5/238 (2006.01)

(52) U.S. Cl. ...................... 348/362; 348/364
(58) Field of Classification Search ............... 348/362, 348/364

See application file for complete search history.

(56) References Cited

U.S. PATENT DOCUMENTS

| | | | |
|---|---|---|---|
| 5,528,291 A * | 6/1996 | Oda | 348/220.1 |
| 5,796,433 A * | 8/1998 | Dyck | 348/311 |
| 5,894,143 A * | 4/1999 | Tanigawa et al. | 257/236 |
| 5,990,952 A * | 11/1999 | Hamasaki | 348/311 |
| 6,452,634 B1 * | 9/2002 | Ishigami et al. | 348/322 |
| 6,476,864 B1 * | 11/2002 | Borg et al. | 348/245 |
| 6,583,818 B1 * | 6/2003 | Toma | 348/312 |
| 6,677,998 B1 * | 1/2004 | Misawa | 348/312 |
| 6,707,494 B1 * | 3/2004 | Misawa et al. | 348/273 |
| 6,809,764 B1 * | 10/2004 | Misawa et al. | 348/272 |
| 6,833,872 B1 * | 12/2004 | Nakagawa | 348/311 |

* cited by examiner

Primary Examiner—Thai Tran
Assistant Examiner—James M. Hannett
(74) Attorney, Agent, or Firm—Straub & Pokotylo; John C. Pokotylo

(57) ABSTRACT

In a solid state image pick-up device, charge transfer gate pulse timing for different phases is intentionally offset resulting in different exposure times for different image element subsets of the image pick-up device. The amount of added signal compensation for an individual pixel is determined as a function of one or more of: exposure time, pixel output signal level, and strobe use.

19 Claims, 5 Drawing Sheets

IMAGE PICKUP APPARATUS INCLUDING COMPENSATION RESPONSIVE TO PHASED DRIVE OF CHARGE TRANSFER GATES

This application claims benefit of Japanese Application No. 2000-378010 filed in Japan on Dec. 12, 2000, the contents of which are incorporated by this reference.

BACKGROUND OF THE INVENTION

1. Field of the Invention

The present invention relates to an image pickup apparatus that incorporates a solid-state image pickup element that can be driven by splitting a charge transfer gate, which controls the transfer of a charge from an image part that makes up a pixel array to a vertical transmission path, into a plurality of phases.

2. Description of the Related Art

In recent years, there has been much development of digital still cameras (hereinafter referred to as electronic cameras) that obtain video signals by picking up the object image using a solid-state image pickup element such as a CCD. Various designs have been conceived for driving this image pickup element. In one of these, a charge is transferred by staggering TG pulse timing.

More specifically, when a mechanical shutter is not used, the charge storing in the image pickup element ends with the output of the aforementioned TG pulse, which transfers a charge from the photoelectric conversion storage part (pixel part) to a vertical transmission path. Accordingly, it is generally preferable that TG pulses be output simultaneously for all pixels and in most cases control is implemented to enable this.

However, depending on the capabilities of the image pickup element, when a TG pulse is applied to all pixels simultaneously, a reverse charge injection phenomenon, caused by major fluctuations in substrate potential in areas around the pixel part, arises from the semiconductor substrate. This in turn causes false signals. One means of countering this anomaly is to split the TG drive line into a plurality of phases and stagger the timing of TG pulses for each phase by the minimum time (by only a few 10 $\mu$s).

In addition to this, another known method that is implemented in order to read neighboring pixels of the same color after adding them together without mixture with other colors using a color image pickup element that is color-coded in a Bayer array, for example, is a so-called "pixel realignment addition and reading", in which the timing of TG drive lines that have been split into a plurality of phases is staggered and the lines then sequentially driven, and a number of pixels (number of lines) are vertically transmitted.

The issue raised when the timing of TG pulses is staggered using phases for various purposes, is that differences in the exposure times in each phase occur equating to those time differences. The differences in exposure appear as anomalies such as lateral stripes (intensity difference among horizontal lines) in the image. A known method of countering this anomaly involves compensation that varies the signal gain to suit the amount of exposure (exposure time). In concept, this is a compensation involving multiplication.

The implementation of analogue gain compensation (multiplication) for each line corresponding to each phase as above is frequently accompanied by an increase in the scale of the hardware and anomalies such as faults arising from line instability. For this reason, multiplication is used for digital signals after the signal output from the image pickup element has been converted into digital format. However, various new problems arise. These are: (1) sometimes calculation processing time increases and processing cannot be completed within a prescribed time; and (2) sometimes, depending on the calculations involved, the effect of bit errors (quantization errors) increases and adequate compensation is not performed.

SUMMARY OF THE INVENTION

An object of the invention is to provide an image pickup apparatus that can, in a short arithmetic operation time, eliminate disalignment between lines without producing anomalies in signal processing.

Simply put, the image pickup apparatus of the present invention includes the following: a solid-state image pickup element that can be driven by splitting into a plurality of phases a charge transfer gate, which controls the transfer of a charge from an image part that makes up a pixel array to a vertical transmission path; a drive circuit that can supply to the aforementioned solid-state image pickup element a plurality of pulses that drive the charge transfer gates and that correspond to the above plurality of phases; an exposure control circuit in which exposure is ended with the output of the aforementioned pulses to drive charge transfer gates after the elapse of a prescribed exposure time from the start of exposure; an output signal reading circuit that reads signals output by the aforementioned solid-state image pickup element; and a signal compensation circuit that adds, to an output signal read by said output signal reading means, a prescribed amount of signal compensation that is determined in correspondence with said exposure time and output signal level, when a plurality of pulses for driving the charge transfer gates corresponding to said plurality of phases are output with prescribed time differences during exposure.

The objects and advantages of the present invention will become further apparent from the following detailed explanation.

DESCRIPTION OF THE PREFERRED EMBODIMENTS

Aspects of the embodiment of the present invention will be explained with reference to the diagrams.

Figure 1:
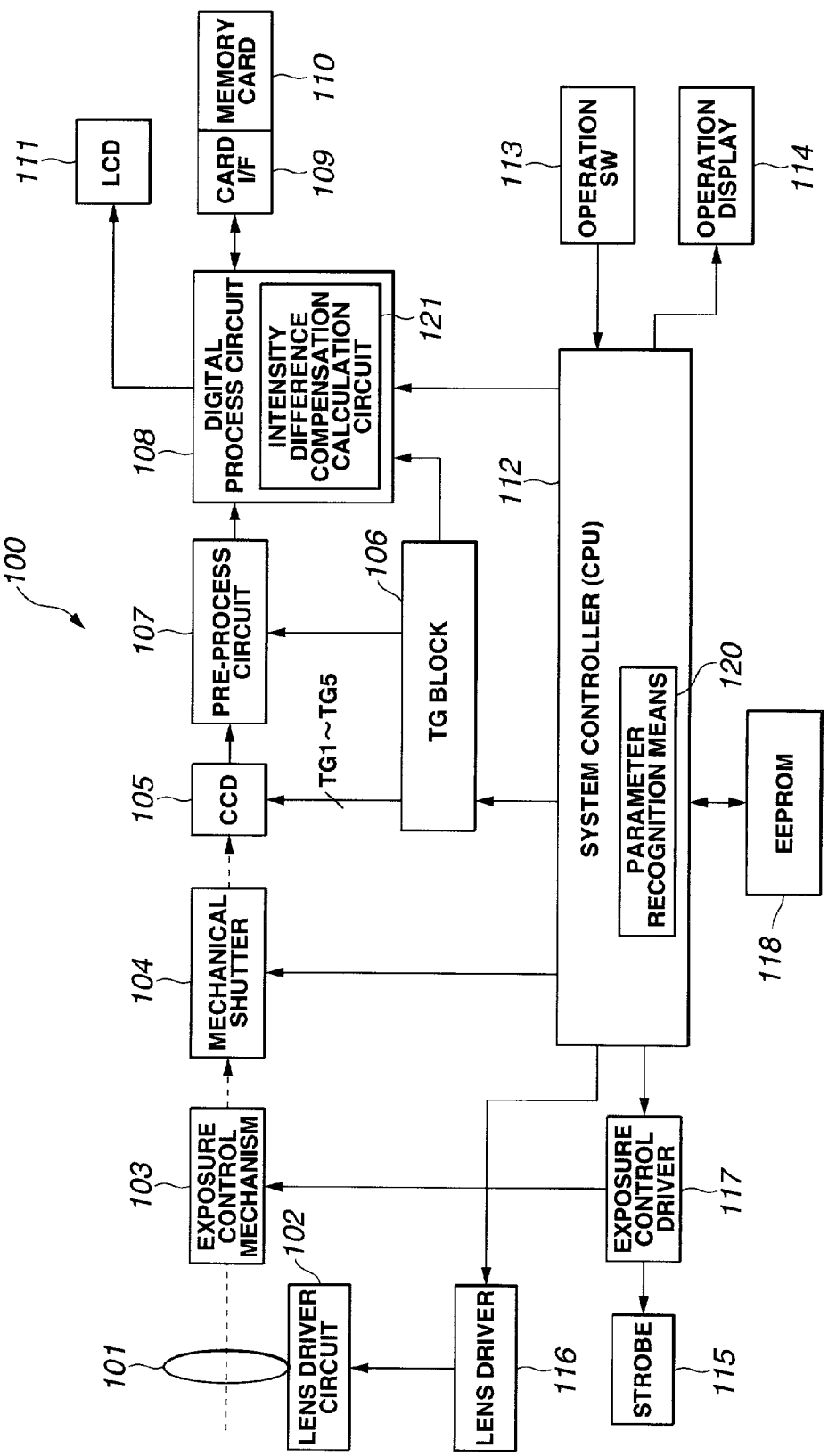
FIG. 1 is a block diagram showing a schematic configuration of a digital camera in a first aspect of the embodiment of the present invention.

FIG. 1 is a block diagram showing the schematic configuration of a digital camera according to a first aspect of the embodiment of the present invention.

As shown in FIG. 1, the digital camera 100 according to this aspect of the embodiment comprises: a lens system 101 consisting of a number of lenses; a lens drive circuit 102 for driving this lens system 101; an exposure control mechanism 103 for controlling the focussing of the lens system 101; a mechanical shutter 104; a CCD color image pickup element 105 with an inbuilt Bayer array color filter; a TG block 106 (including a timing generator TG and SG) for driving this CCD color image pickup element 105; a pre-process circuit 107 (including a CDS sample hold circuit, clamp circuit, and A/D converter) that is a circuit for pre-processing the CCD output signal of the CCD image color pickup element 105; a digital process circuit 108 for implementing various digital processes such as gamma conversion processing, color signal generation processing, and matrix conversion processing; a card interface 109 that enables freely attaching and detaching an external memory card 110; and an LCD image display system 111.

Also, this digital camera 100 is equipped with a system controller (CPU) 112 for overall control of all parts. The system controller 112 is equipped with a parameter recognition means 120 that acts as an internal function. This parameter recognition means 120 recognises an exposure time (shutter number tn), signal level for each pixel, and group to which each pixel belongs.

In addition, the above digital process circuit 108 is equipped with a disalignment compensation calculation circuit 121 that is an internal function and that performs processing such as gamma conversion processing, color signal generation processing, and matrix conversion processing. This disalignment compensation calculation circuit 121 adds the amount of compensation determined in accordance with compensation tables provided below to the pixel signal level. That is, when TG pulses from a TG block 106 are output using a prescribed time difference in the timing, it adds the amount of signal compensation, prescribed to suit exposure times and output signal levels, to the CCD output signal of the CCD color image pickup element 105. A detailed explanation will be provided below.

The digital camera 100 comprises: an operating switch system 113 comprising various operation buttons; an operation display system 114 for displaying the operation and mode statuses; a strobe 115 that acts as lighting means; a lens driver 116 for controlling the above lens drive circuit 102; an exposure control driver 117 for controlling the strobe 115 and exposure control mechanism 103; and non-volatile memory (EEPROM) for storing information about various settings.

All control in the digital camera 100 of this aspect of the embodiment is implemented as part of the comprehensive control of all parts by the system controller 112. In particular, addition and reading in the CCD color image pickup element 105 is implemented using the TG block 106 under the control of the system controller 112. Also, digital addition and all other signal processing is implemented by the digital process circuit 108 under the control of the system controller 112. That is, the TG block 106 controls the driving of the CCD color image pickup element 105, reads exposure (charge storage) and signals, incorporates signals read via the pre-process circuit 107 into the digital process circuit 108 and, after executing various types of signal processing, stores data on a removable memory card 110 via a card interface 109.

When a strobe 115 is used in the aforementioned exposure, under the control of the system controller 112, the strobe 115 is made to emit light by controlling the exposure control driver 117 and by sending all lighting start and stop control signals to the strobe 115.

Further, in this aspect of the embodiment, a progressive scanning interline structure is used as the above CCD color image pickup element 105. The vertical transmission path is driven by an ordinary four phases. In a four-phase drive CCD image pickup element, the transmission electrode is a four-phase electrode (that is, there are four corresponding drive input terminals) but of these, one specific phase is allocated for the transfer of a charge from the photoelectric area to the transmission path. The charge is transferred by applying a high voltage (transfer gate pulse TGP (sample value +15 V) of reverse polarity to that when an ordinary charge is transmitted (sample value −7 V) in that electrode. In other words, the one phase uses both the transmission electrode and the transfer gate electrode for transferring a charge.

Also, the drive lines for the charge transfer gate electrodes (TG electrode; transfer gate electrode) in the CCD color image pickup element 105 are split into a plurality of phases (n phases) and can drive TG electrodes separately for each phase. In short, the transfer of a charge from each pixel part (photoelectric conversion area) to the vertical transmission path must be done selectively and not for all pixels to enable the special driving by conventional realignment addition and reading method. To realise such a function, the TG electrode in this aspect of the embodiment is split into electrode groups of n line cycles to enable the above selective charge transfer. This configuration allows the application of a gate driving pulse (TG pulse) for independent transfer of charges for each of those electrode groups.

In this aspect of the embodiment, n=5, and there is a similar cyclical electrode group (line group) configuration. This configuration enables the CCD image pickup element 105 to be driven using TG1 through TG5, the corresponding independent TG pulses. These TG1 through TG5 (+15 V) are output from the TG block 106 and the timing with which the pulses are generated is controlled by the TG block 106.

That is, when all pixels are individually read, or when well-known n-line addition driving, in which n vertical lines are all added together by a horizontal transmission line and read, is implemented, ordinarily TG1 through TG5 will simultaneously occur, and the signal charge for all pixels will have to be transferred from the pixel part to the vertical transmission path. However, in this aspect of the embodiment, to prevent the reverse charge injection phenomenon that occurs because of simultaneous occurrence of TG1 through TG5 (simultaneous leading edge, simultaneous trailing edge), adjustment of the timing with which TG1 through TG5 occur as a result of TG block 106 ensures that TG1 through TG5 will have neither simultaneous leading or trailing edges.

In a digital camera according to this aspect of the embodiment, the part relating to the aforementioned adjustment of the timing of TG1 through TG5 implements the same operations and control as an ordinary digital camera except for the compensation calculations involved for the resulting intensity difference among horizontal lines. Therefore, explanation of these known parts will be omitted.

Next, the basic electrode structure of the aforementioned CCD color image pickup element 105 will be explained with reference to FIG. 2.

Figure 2:
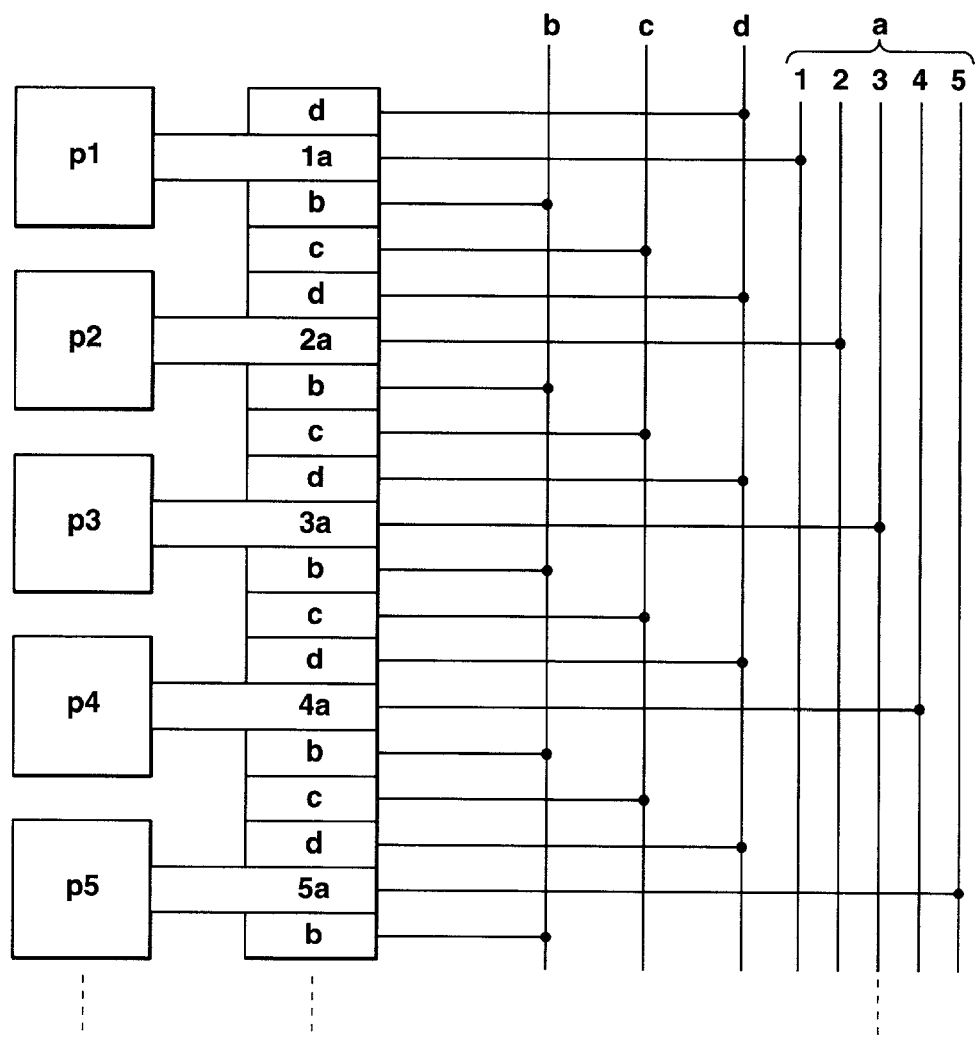
FIG. 2 is a circuit diagram showing the basic electrode structure of a CCD color image pickup element in a digital camera according to a first aspect of the embodiment.

FIG. 2 is a circuit diagram that shows the basic electrode structure of a CCD color image pickup element in a digital camera according to this first aspect of the embodiment.

As shown in FIG. 2, a photoelectric conversion area (pixel part) containing photo-diodes is arranged in a row and column matrix in the CCD color image pickup element 105. A vertical transmission path is provided for each pixel in a vertical column and a horizontal transmission path common to all vertical transmission paths is also provided.

FIG. 2 shows only the pixel part for one vertical column and the structure corresponding to the corresponding vertical transmission path. Also, in FIG. 2, p1, p2, p3, p4, and p5 each shows a pixel part and a, b, c, and d show the drive electrode (VCCD) for a four-phase drive vertical transmission path.

Of these drive electrodes (VCCD), electrode a is also used as the transfer electrode (transfer gate (TG) electrode) for transferring a charge from a pixel part to a vertical transmission path. By applying to electrode a a TG pulse with a voltage higher than the voltage that is applied when a vertical transmission path is driven, a charge is transferred from the pixel part to the vertical transmission path. Electrodes b, c, and d, are the same in all pixel parts.

Electrode a (TG electrode) is common between pixel parts in the horizontal direction (along rows) to enable various isochromatic addition driving and pixel realignment. However, in the vertical direction, electrode a is split into electrode groups corresponding to each of the n lines in an n line cycle. Of course, in this aspect of the embodiment the aim is to distribute, over time, fluctuations in potential caused by the application of TG pulses and so it is preferable that the CCD image pickup element has an electrode structure that enables the application of a plurality of TG pulses. There are no restrictions placed on the split cycle structure of a TG electrode itself.

Next, the timing with which TG1 through TG5 occur when signal charges for all pixels must be transferred from pixel parts to vertical transmission paths will be explained using FIG. 3 for reference.

Figure 3:
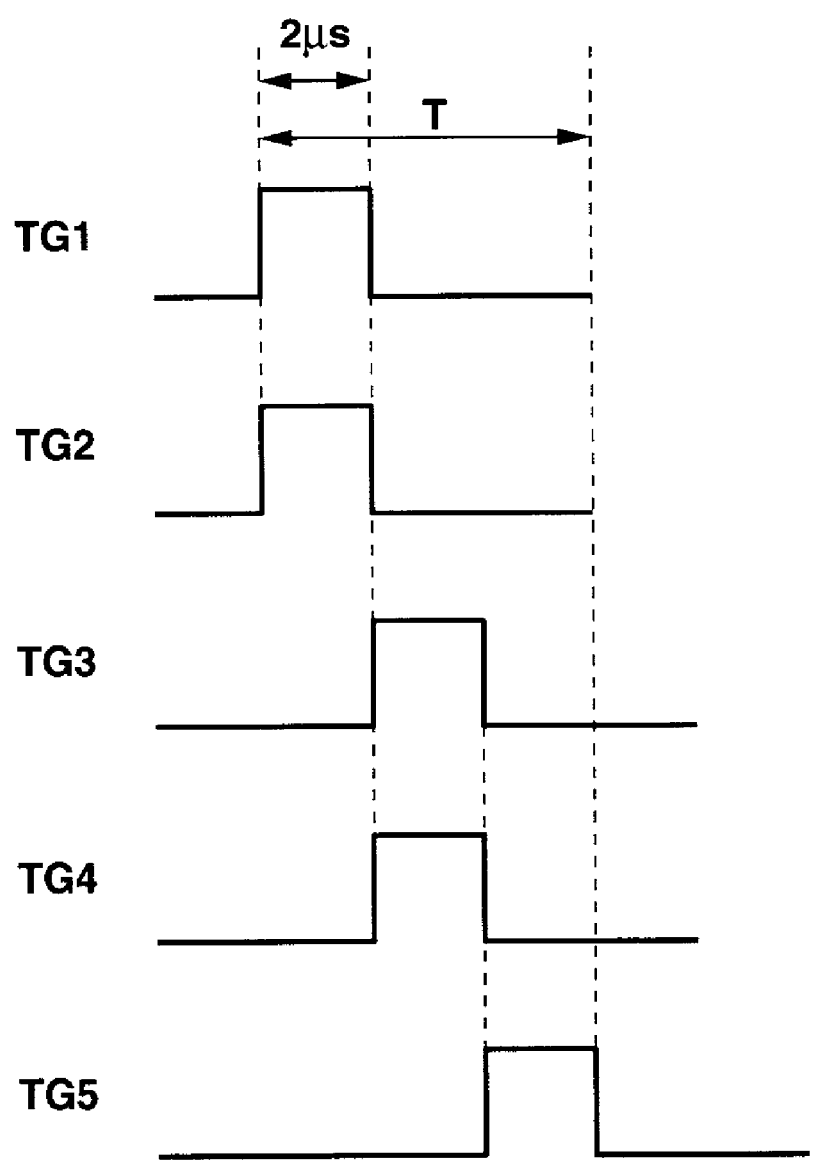
FIG. 3 is a timing chart that shows an example of timing used in a digital camera according to a first aspect of the embodiment.

FIG. 3 is a timing chart that shows an example of the timing used in a digital camera according to this first aspect of the embodiment. Here, even if the leading or trailing edge of up to two TG pulses occurs simultaneously, it is assumed that the fluctuations in potential will be within the allowable range and the reverse charge injection phenomenon will not occur.

That is, first TG1 and TG2 occur simultaneously. Next, the trailing edges of TG1 and TG2 and the leading edges of TG3 and TG4 occur simultaneously. Then, the trailing edges of TG3 and TG4 and the leading edge of TG5 occur simultaneously. In this aspect of the embodiment, the only time at which the simultaneous leading edges of two TG pulses occur by themselves is when the TG1 and TG2 first occur. The leading edges of TG3 and TG4 occur at the same time as the trailing edges of TG1 and TG2 and so any fluctuations in potential are cancelled out. Furthermore, the leading edge of TG5 occurs at the same time as the trailing edges of TG3 and TG4 and so the fluctuation in potential is subtracted resulting in the leading edge of just one TG pulse.

Here, the time difference between the line group (first group) corresponding to TG1 and TG2 and the line group corresponding to TG3 and TG4 (second group) and the time difference between the second group and the line group corresponding to TG5 (third group) will be 2 $\mu$s. Accordingly, the largest time difference is that between the first and the third groups, that is a time difference of 4 $\mu$s. Ordinarily, the visibly detectable intensity difference among horizontal lines is approximately 1% and so there is no need for disalignment compensation for exposure times of 400 $\mu$s or more. Disalignment compensation is required for lesser exposure times.

In the digital camera 100 according to this aspect of the embodiment, the high end of the shutter speeds is divided into the following approximately ⅓ Ev (Tv) slices:

1/10,000 s (100 $\mu$s), 1/8,000 s (125 $\mu$s), 1/6,500 s (154 $\mu$s), 1/5,000 s (200 $\mu$s), 1/4,000 s (250 $\mu$s), 1/3,000 s (333 $\mu$s), and 1/2,500 s (400 $\mu$s).

As explained above, disalignment compensation is required when the exposure time is less than 400 $\mu$s. Therefore, in this aspect of the embodiment, disalignment compensation calculations will be implemented in the disalignment compensation calculation circuit 121 within the digital process circuit 108 only for high shutter speeds of 1/3,000 s (333 $\mu$s) or more.

For ease of explanation, below the above shutter speeds will be expressed as shutter numbers tn=0, 1, 2 . . . For example, tn=0 means 100 $\mu$s and tn=5 means 333 $\mu$s. That is, in this aspect of the embodiment, compensation calculation using the disalignment compensation calculation circuit 121 is only executed when the parameter recognition means 120 in the system controller 112 recognises that tn≦5.

Also, the addition compensation, as calculated by the disalignment compensation calculation circuit 121, is made for the signal that occurs after standard gamma processing (gamma ≈0.45) is executed for video signal generation in the digital process circuit 108 for the CCD color image pickup element 105 output signal. Here, compensation is enabled even in a linear signal area but when the signal level is high, a correspondingly large compensation value must be added. Therefore, the number of classifications increases and calculations are made more complex. Once the gamma compensation used in this aspect of the embodiment is completed, areas with high-level signals become more compressed and therefore disalignment is also compressed. This means that calculations, as shown below, that require less classifying (relating to signal level) will be sufficient.

The classifying involved in a specific instance of compensation processing in this aspect of the embodiment is expressed in the sample table of Table 1. The specific added values shown in Table 1 are used for 8-bit (0 through 255) signals.

TABLE 1

| Signal level ↓ | tn → | 0 | 1 | 2 | 3 | 4 | 5 |
|---|---|---|---|---|---|---|---|
| X < 80 | First group | 0 | 0 | 0 | 0 | 0 | 0 |
| | Second group | 0 | 0 | 0 | 0 | 0 | 0 |
| | Third group | 0 | 0 | 0 | 0 | 0 | 0 |
| 80 ≦ X < 144 | First group | 2 | 2 | 1 | 1 | 1 | 1 |
| | Second group | 1 | 1 | 1 | 0 | 0 | 0 |
| | Third group | 0 | 0 | 0 | 0 | 0 | 0 |
| 144 ≦ X | First group | 4 | 3 | 3 | 1 | 1 | 1 |
| | Second group | 2 | 1 | 1 | 1 | 0 | 0 |
| | Third group | 0 | 0 | 0 | 0 | 0 | 0 |

As shown in Table 1, in this aspect of the embodiment, the signal level for an 8-bit (0 through 255) signal is divided into three levels (x<80, 80≦x<144, and 144≦x). These are then divided for the above three line groups (first group corresponding to TG1 and TG2, second group corresponding to TG3 and TG4, and third group corresponding to TG5), and the values to be added are pre-stored.

In other words, the above parameter recognition means 120 recognises the exposure time (shutter number tn), the signal level for each pixel, and the group to which that signal belongs, then adds the compensation, as determined by the disalignment compensation calculation circuit 121 in accordance with the compensation table, to the signal level of those pixels. Because the third group has the longest exposure time, the compensation value is always 0. (That is, here, compensation is only actually implemented for the first and second groups and table data for the third group is not required.) The above explanation is an explanation of standard processing.

In this aspect of the embodiment, compensation by addition is implemented for the first and second groups using the third group as a standard. However, this is not restrictive and compensation can be subtracted from the third group and added to the first group using the second group as the standard, or compensation can be subtracted from the second and third groups using the first group as the standard.

The above standard processing is effective when exposure is ended by a TG pulse. For example, in cases such as when a strobe is used, exposure ends in a practical sense when lighting ends and thereafter, all exposure is ended by the TG pulse. In such cases, there no theoretical intensity difference among horizontal lines and so overcompensation will occur if the above standard processing occurs. This itself will cause intensity difference among horizontal lines. Therefore, the following condition judgement is added to prevent overcompensation when a strobe is used.

Figure 4:
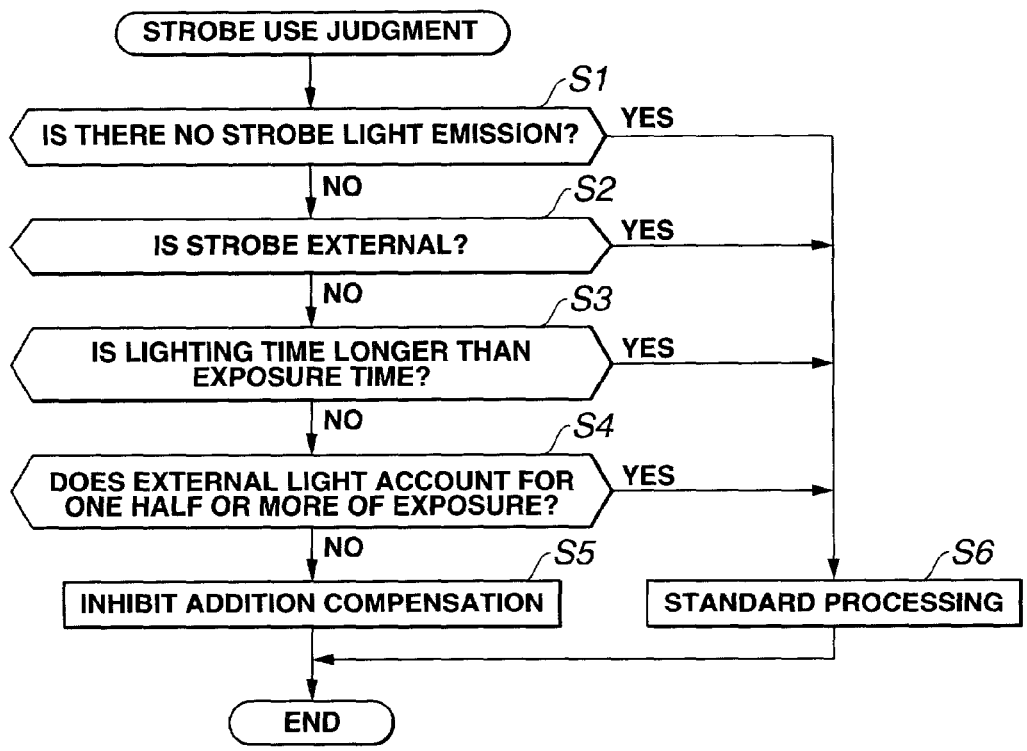
FIG. 4 is a flowchart showing judgements made in an addition and compensation processing relating to the use of a strobe in a digital camera according to a first aspect of the embodiment.

That is, the parameter recognition means 120 implements the condition judgements as shown in FIG. 4, based on information from the exposure control system, and inhibits addition compensation.

FIG. 4 is a flowchart that shows the judgements made in addition compensation processing relating to the use of a strobe in the digital camera according to this first aspect of the embodiment.

The system controller 112 first determines whether or not the strobe is emitting light (step S1). Processing moves to step S6 when the strobe is not emitting light and standard processing is implemented.

In contrast, when the strobe is emitting light, a judgement is made as to whether or not the strobe is an external strobe (step S2). Processing moves to step S6 when the strobe is an external strobe and standard processing is implemented.

On the other hand, when the strobe is an internal strobe, next the system controller 112 determines whether or not the lighting time is longer than the exposure time (step S3). When the lighting time is longer than the exposure time, processing moves to step S6 and standard processing is implemented.

When the lighting time is shorter than the exposure time, a judgement is next made as to whether or not outside light accounts for at least one half of the exposure (step S4). When it does, processing moves to S6 and standard processing is implemented.

On the other hand, when outside light accounts for less than half the exposure, processing to inhibit addition compensation is implemented (step S5) and this routine ends.

In other words, because the lighting time is generally longer when an external strobe is used, the exposure is actually ended by the TG. This is also the case when external light accounts for a large proportion of total exposure. When the contribution of an internal strobe is large, exposure actually ends with the end of strobe lighting, only when the lighting time (this changes greatly even for the same amount of exposure on the image surface depending for example on the distance to the object) is less than the exposure time. Therefore, only in this case is the above inhibition processing used.

In the above, when strobe lighting starts, so-called front-curtain flash synchronization is used at the same time as exposure starts. Here, as above, depending on whether or not the lighting time is longer than the exposure time, the exposure is actually ended by the TG pulse or by the end of strobe lighting.

As discussed above, except for this addition compensation, all other processing is the same as in well-known existing cameras. After the prescribed signal processing (including compression processing when required), data is stored on a memory card, which is the storage medium.

Use of the digital camera according to the above first aspect of the embodiment enables intensity difference among horizontal lines to be eliminated in a short arithmetic operation time without producing anomalies in signal processing.

Note here that the present invention is not limited to the above aspect of the embodiment. Firstly, as explained above, even when a strobe is used for lighting, the exposure is actually ended by a TG and so various classifications are implemented. However, in many cases, when a strobe is used, exposure is actually ended by the strobe. Therefore, to simplify control it goes without saying that all the above compensation inhibition processing can be implemented when a strobe, including an external strobe, is used.

On the other hand, for example in the first aspect of the embodiment, as shown in above FIG. 4, when, by the judgement as to whether external light accounts for at least one half of exposure, it is determined that the external light accounts for less than half, addition compensation inhibition processing is implemented. However, another possible response would be to change the amount of compensation rather than inhibit compensation. That is, control can ensure that the amount of compensation is changed (or inhibited when compensation=0) to suit the degree of contribution of a strobe and external light.

Next, a second aspect of the embodiment that incorporates this point will be explained.

A digital camera according to this second aspect of the embodiment has the same configuration as the digital camera according to the above first aspect of the embodiment. The only difference is in the judgement relating to addition compensation processing when a strobe is used. All other configurations and actions are the same as in the above first aspect of the embodiment so detailed explanation will be omitted here.

In a second aspect of the embodiment, standard processing (using Table 1 as in above first aspect of the embodiment) is implemented when external light accounts for two thirds or more of exposure. For a contribution of between one third and two thirds, compensation processing in which the addition is smaller than in standard processing, that is small addition compensation processing (using Table 2) is implemented. When the contribution is one third or less, processing to inhibit addition compensation is implemented as in the above first aspect of the embodiment.

When the contribution is between one third and two thirds, small addition compensation is implemented in accordance with Table 2 below.

TABLE 2

| Signal level ↓ | tn → | 0 | 1 | 2 | 3 | 4 | 5 |
|---|---|---|---|---|---|---|---|
| X < 80 | First group | 0 | 0 | 0 | 0 | 0 | 0 |
|  | Second group | 0 | 0 | 0 | 0 | 0 | 0 |
|  | Third group | 0 | 0 | 0 | 0 | 0 | 0 |
| 80 ≦ X < 144 | First group | 1 | 1 | 0 | 0 | 0 | 0 |
|  | Second group | 0 | 0 | 0 | 0 | 0 | 0 |
|  | Third group | 0 | 0 | 0 | 0 | 0 | 0 |

TABLE 2-continued

| Signal level ↓ | tn → | 0 | 1 | 2 | 3 | 4 | 5 |
|---|---|---|---|---|---|---|---|
| 144 ≦ X | First group | 2 | 1 | 1 | 0 | 0 | 0 |
| | Second group | 1 | 0 | 0 | 0 | 0 | 0 |
| | Third group | 0 | 0 | 0 | 0 | 0 | 0 |

Figure 5:
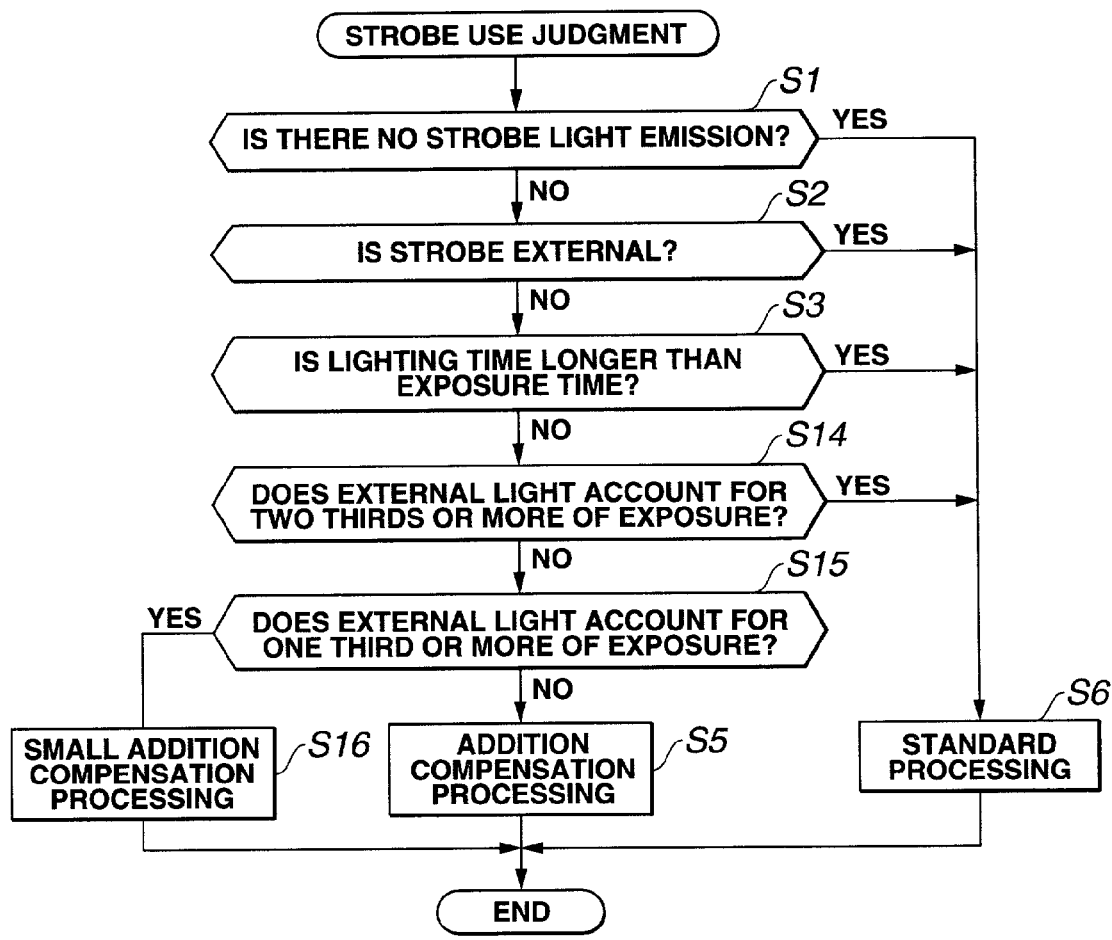
FIG. 5 is a flowchart showing judgements made in an addition and compensation processing relating to the use of a strobe in a digital camera according to a second aspect of the embodiment of the present invention.

FIG. 5 is a flowchart that shows the judgement for addition compensation processing relating to the use of a strobe in a digital camera according to a second aspect of the embodiment of the present invention.

The system controller 112 firstly, as in the above first aspect of the embodiment, determines whether or not the strobe is emitting light (step S1). When the strobe is not emitting light, processing moves to step S6 and standard processing is implemented.

On the other hand, when the strobe is emitting light, the system controller 112 next determines whether or not the strobe is an external strobe (step S2). Here, when it is an external strobe, processing moves to step S6 and standard processing is implemented.

When the strobe is an internal strobe, the system controller 112 next determines whether or not the lighting time is longer than the exposure time (step S3). Here, when the lighting time is longer than the exposure time, processing moves to step S6 and standard processing is implemented.

When the lighting time is less than the exposure time, the system controller 112 next determines whether or not external light accounts for two thirds or more of exposure (step S14). When it does, processing moves to step S6 and standard processing is implemented.

On the other hand, if external light accounts for less than two thirds of exposure, the system controller 112 next determines whether or not external light accounts for one third or more of exposure (step S15). When it does, processing moves to step S16 and small addition compensation processing is implemented.

When external light accounts for less than one third of exposure, processing to inhibit addition compensation is implemented (step S5) and this routine ends.

In this second aspect of the embodiment, finer compensation is enabled and intensity difference among horizontal lines can be effectively eliminated.

Also, there are many reasons why the timing of TG pulses may be staggered and this aspect of the embodiment can be applied as in the "pixel realignment addition and reading" discussed in the section on related art.

Furthermore, the present invention is not limited to digital still cameras but can be applied in any image pickup apparatus including movie cameras.

In addition, various modifications are enabled within a range that does not deviate from the thrust of the present invention.

Use of the present invention as described above enables the provision of an image pickup apparatus that can, in a short arithmetic operation time, eliminate intensity difference among horizontal lines without producing anomalies in signal processing.

In this invention, it is apparent that a wide variety of working modes are enabled through the use of this invention without departing from the spirit and scope of the invention. This invention is not restricted by any specific embodiment except as limited by the appended claims.

What is claimed is:

1. An image pickup apparatus, comprising:
   a solid-state image pickup element including
      a plurality of image parts forming a pixel array,
      a plurality of charge transfer gates, wherein each of said image parts is coupled with a charge transfer gate, and wherein each charge transfer gate can be controlled to transfer a charge from a coupled image part to a transmission path, and
      a charge transfer gate electrode split into a plurality of phases, wherein each of said plurality of charge transfer gates is associated with one of the plurality of phases thereby defining a plurality of sets of charge transfer gates, and wherein a drive signal via a charge transfer gate electrode of a given phase controls the corresponding set of associated charge transfer gates to transfer charges from a set of image parts to the transmission path;
   driving means for supplying a plurality of pulses, each of said pulses for driving a different set of charge transfer gates corresponding to one of said plurality of phases;
   exposure control means that ends exposure by control signalling resulting in the output by said driving means of said plurality of pulses driving said different sets of charge transfer gates, wherein, for a given image part, exposure ends with its corresponding charge transfer gate acting on a received corresponding driving pulse, said plurality of pulses driving said different sets of charge transfer gates resulting in different exposure times for at least some different sets of image parts for the same exposure setting;
   means of reading output signals that reads signals output by said solid-state image pickup element; and
   signal compensation means that conditionally implements adding, to output signals read by said means of reading output signals, prescribed amounts of signal compensation, wherein each of said prescribed amounts of signal compensation is determined using the exposure time of the image part or parts from which the output signal is derived, and
   wherein said plurality of pulses are output with prescribed time differences.

2. The image pickup apparatus according to claim 1, wherein said signal compensation means adds said prescribed amount of signal compensation after implementing prescribed gamma conversion processing for said output signal read by said means for reading output signals.

3. An image pickup apparatus, comprising:
   a solid-state image pickup element that can be driven by splitting, into a plurality of phases, a charge transfer gate, which controls the transfer of a charge from an image part, which forms part of a pixel array, to a vertical transmission path;
   driving means capable of supplying a plurality of pulses for driving a charge transfer gate corresponding to said plurality of phases to said solid-state image pickup element;
   exposure control means that ends exposure through the output of said pulse for driving charge transfer gate when a prescribed exposure time has elapsed since the start of exposure;
   means of reading output signals that reads signals output by said solid-state image pickup element; and
   signal compensation means that adds, to an output signal read by said means of reading output signals, a prescribed amount of signal compensation that is determined in correspondence with said exposure time and output signal level, when a plurality of pulses for driving the charge transfer gates corresponding to said plurality of phases are output with prescribed time differences during exposure, and wherein said signal compensation means implements said adding said prescribed amount of signal compensation after implementing prescribed gamma conversion processing for output signal read by said means for reading output signals, and wherein said signal compensation means does not implement said adding said prescribed amount of signal compensation when said exposure time is a prescribed value or more.

4. The image pickup apparatus according to claim 3, wherein said signal compensation means changes said prescribed amount of signal compensation in correspondence with the state of use of strobe during the exposure.

5. An image pickup apparatus, comprising:

a solid-state image pickup element that can be driven by splitting, into a plurality of phases, a charge transfer gate, which controls the transfer of a charge from an image part, which forms part of a pixel array, to a vertical transmission path;

driving means capable of supplying a plurality of pulses for driving a charge transfer gate corresponding to said plurality of phases to said solid-state image pickup element;

exposure control means that ends exposure through the output of said pulse for driving charge transfer gate when a prescribed exposure time has elapsed since the start of exposure;

means of reading output signals that reads signals output by said solid-state image pickup element; and signal compensation means that adds, to an output signal read by said means of reading output signals, a prescribed amount of signal compensation that is determined in correspondence with said exposure time and output signal level, when a plurality of pulses for driving the charge transfer gates corresponding to said plurality of phases are output with prescribed time differences during exposure, and wherein said signal compensation means implements said adding said prescribed amount of signal compensation after implementing prescribed gamma conversion processing for output signal read by said means for reading output signals, and wherein said signal compensation means changes said prescribed amount of signal compensation in correspondence with the state of use of strobe during the exposure.

6. An image pickup apparatus, comprising:

a solid-state image pickup element that can be driven by splitting, into a plurality of phases, a charge transfer gate, which controls the transfer of a charge from an image part, which forms part of a pixel array, to a vertical transmission path;

driving means capable of supplying a plurality of pulses for driving a charge transfer gate corresponding to said plurality of phases to said solid-state image pickup element;

exposure control means that ends exposure through the output of said pulse for driving charge transfer gate when a prescribed exposure time has elapsed since the start of exposure;

means of reading output signals that reads signals output by said solid-state image pickup element; and signal compensation means that adds, to an output signal read by said means of reading output signals, a prescribed amount of signal compensation that is determined in correspondence with said exposure time and output signal level, when a plurality of pulses for driving the charge transfer gates corresponding to said plurality of phases are output with prescribed time differences during exposure, and wherein said signal compensation means does not implement said adding said prescribed amount of signal compensation when said exposure time is a prescribed value or more.

7. The image pickup apparatus according to claim 6, wherein said signal compensation means changes said prescribed amount of signal compensation in correspondence with the state of use of strobe during the exposure.

8. An image pickup apparatus, comprising:

a solid-state image pickup element that can be driven by splitting, into a plurality of phases, a charge transfer gate, which controls the transfer of a charge from an image part, which forms part of a pixel array, to a vertical transmission path;

driving means capable of supplying a plurality of pulses for driving a charge transfer gate corresponding to said plurality of phases to said solid-state image pickup element;

exposure control means that ends exposure through the output of said pulse for driving charge transfer gate when a prescribed exposure time has elapsed since the start of exposure;

means of reading output signals that reads signals output by said solid-state image pickup element; and signal compensation means that adds, to an output signal read by said means of reading output signals, a prescribed amount of signal compensation that is determined in correspondence with said exposure time and output signal level, when a plurality of pulses for driving the charge transfer gates corresponding to said plurality of phases are output with prescribed time differences during exposure, and wherein said signal compensation means changes said prescribed amount of signal compensation in correspondence with the state of use of strobe during the exposure.

9. An image pickup apparatus, comprising:

a two dimensional image pickup element that has a photoelectric conversion part arranged two-dimensionally and a vertical transmission path that is driven by a plurality of phase drive pulses, wherein of this plurality of phase drive pulses the drive pulse for one phase is further divided into a plurality of phases and acts as a pulse for transferring a signal charge from said photoelectric conversion part to said vertical transmission path;

exposure parameters recognition means that determines exposure parameters for said image pickup element, including exposure time and flash use status, and recognises whether or not those parameters are prescribed exposure conditions; and disalignment compensation means that adds output signal that has been converted into digital signal by said image pickup element and prescribed compensation value when said exposure parameter recognition means recognises that said image pickup element is being driven under prescribed exposure conditions.

10. The image pickup apparatus according to claim 9, wherein said prescribed compensation value is an addition value held in a table.

11. The image pickup apparatus according to claim 9, wherein said exposure parameter recognition means recognises said prescribed exposure conditions based on the correlation between the timing with which flash lighting stops and the timing with which said drive pulse for one phase is generated.

12. The image pick-up apparatus according to claim 1, wherein each of said prescribed amounts of signal compensation is determined further using output signal level.

13. The image pickup apparatus according to claim 12, wherein said output signal level is determined on a per pixel basis, and wherein different pixels within a pixel array, which correspond to a portion of a composite image picked-up by said image pick-up element and which also correspond to the same drive transfer gate drive pulse, can have different values of prescribed compensation which is added to said output signal, said different values of prescribed compensation being determined as a function of said output signal level corresponding to the pixel.

14. The image pickup apparatus according to claim 1, wherein when said exposure setting is greater than an upper limit, said signal compensation means does not perform said adding to output signals prescribed amounts of signal compensation to any of said output signals.

15. The image pickup apparatus according to claim 1, wherein when said signal compensation means does perform said adding prescribed amounts of signal compensation to output signals, said signal compensation means adds prescribed amounts of signal compensation to some output signals but does not add prescribed amounts of signal compensation to any output signals corresponding to one of said plurality of pulses.

16. The image pickup apparatus of claim 15, wherein said one of said plurality of pulses is a pulse resulting in the longest exposure time.

17. The image pick-up apparatus according to claim 1, wherein said plurality of pulses are structured such that at least some of the pulses have concurrent timing and wherein a first set of a plurality of pulses with first concurrent timing are aligned with a second set of a plurality of pulses with second concurrent timing such that the falling edges of the first set of pulses correspond to the rising edges of the second set of pulses, said first and second sets being disjoint sets within said plurality of pulses.

18. The image pick-up apparatus according to claim 17, wherein each one of said plurality of pulses has at least one edge which aligns with an edge of at least one other pulse within said plurality of pulses.

19. The image pick-up apparatus according to claim 1, wherein said adding prescribed amounts of signal compensation includes adding negative amounts of signal compensation to at least some output signals.

* * * * *